US009761216B2

(12) United States Patent
Nampy et al.

(10) Patent No.: US 9,761,216 B2
(45) Date of Patent: Sep. 12, 2017

(54) ACOUSTIC PANEL WITH ANGLED CORRUGATED CORE STRUCTURES

(71) Applicant: Rohr, Inc., Chula Vista, CA (US)

(72) Inventors: Sreenivas Narayanan Nampy, San Diego, CA (US); David M. Adams, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 15/040,637

(22) Filed: Feb. 10, 2016

(65) Prior Publication Data
US 2017/0229106 A1    Aug. 10, 2017

(51) Int. Cl.
| | | |
|---|---|---|
| *G10K 11/172* | (2006.01) | |
| *G10K 11/168* | (2006.01) | |
| *G10K 11/175* | (2006.01) | |
| *F02C 7/24* | (2006.01) | |
| *G10K 11/28* | (2006.01) | |
| *G10K 11/16* | (2006.01) | |

(52) U.S. Cl.
CPC .......... *G10K 11/172* (2013.01); *G10K 11/168* (2013.01); *G10K 11/175* (2013.01); *G10K 11/28* (2013.01); *F02C 7/24* (2013.01); *G10K 11/161* (2013.01)

(58) Field of Classification Search
CPC ......... F02C 7/24; F02C 7/045; G10K 11/172; G10K 11/175; F02K 1/827; B64D 2033/0206; B64D 2033/0213
USPC ................................. 181/213, 214, 222, 292
See application file for complete search history.

(56) References Cited

U.S. PATENT DOCUMENTS

| | | | |
|---|---|---|---|
| 3,380,206 A | 4/1968 | Barnett | |
| 3,542,152 A | 11/1970 | Adamson et al. | |
| 3,639,106 A | 2/1972 | Yate | |
| 3,642,094 A | 2/1972 | Yancey | |
| 3,734,234 A | 5/1973 | Wirt | |
| 3,819,007 A * | 6/1974 | Wirt | E04B 1/86 181/286 |
| 3,821,999 A | 7/1974 | Guess et al. | |

(Continued)

FOREIGN PATENT DOCUMENTS

| | | |
|---|---|---|
| CN | 104723616 | 6/2015 |
| FR | 2201010 | 4/1974 |

(Continued)

OTHER PUBLICATIONS

EP search report for EP17155549.3 dated Jul. 27, 2017.

*Primary Examiner* — Jeremy Luks
(74) *Attorney, Agent, or Firm* — O'Shea Getz P.C.

(57) ABSTRACT

A panel is provided for attenuating noise. This panel includes a first skin, a second skin and a core, which forms a plurality of cavities vertically between the first skin and the second skin. The core includes a first wall, a second wall, a first baffle, a second baffle and a first septum. The cavities include a first cavity formed laterally between the first wall and the second wall and longitudinally between the first baffle and the second baffle. The first septum is longitudinally between the first baffle and the second baffle and divides the first cavity into fluidly coupled sub-cavities. The first septum is angularly offset from the first wall by an acute angle. One or more perforations in the first skin are fluidly coupled with the first cavity.

19 Claims, 11 Drawing Sheets

(56) References Cited

U.S. PATENT DOCUMENTS

| | | | |
|---|---|---|---|
| 3,831,710 A * | 8/1974 | Wirt | G10K 11/172 |
| | | | 181/286 |
| 3,850,261 A | 11/1974 | Hehmann et al. | |
| 3,910,374 A | 10/1975 | Holehouse | |
| 3,948,346 A | 4/1976 | Schindler | |
| 4,189,027 A | 2/1980 | Dean, III et al. | |
| 4,240,519 A | 12/1980 | Wynosky | |
| 4,541,879 A | 9/1985 | Riel | |
| 4,743,740 A | 5/1988 | Adee | |
| 5,028,474 A * | 7/1991 | Czaplicki | B31D 3/005 |
| | | | 428/116 |
| 5,292,027 A * | 3/1994 | Lueke | B65D 90/06 |
| | | | 220/495.06 |
| 5,923,003 A | 7/1999 | Arcas et al. | |
| 5,927,647 A | 7/1999 | Masters et al. | |
| 5,997,985 A | 12/1999 | Clarke et al. | |
| 6,871,725 B2 | 3/2005 | Johnson | |
| 7,124,856 B2 | 10/2006 | Kempton et al. | |
| 7,588,212 B2 | 9/2009 | Moe et al. | |
| 7,784,283 B2 | 8/2010 | Yu et al. | |
| 7,814,658 B2 | 10/2010 | Akishev et al. | |
| 7,954,224 B2 | 6/2011 | Douglas | |
| 7,959,109 B2 | 6/2011 | Dasilva et al. | |
| 7,963,362 B2 | 6/2011 | Lidoine | |
| 7,971,684 B2 | 7/2011 | Gantie et al. | |
| 8,025,122 B2 | 9/2011 | Gilcreest et al. | |
| 8,245,815 B2 | 8/2012 | Valleroy et al. | |
| 8,336,316 B2 | 12/2012 | Kirby | |
| 8,413,922 B2 | 4/2013 | Porte et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,763,751 B2 | 7/2014 | Starobinski et al. | |
| 8,776,946 B2 | 7/2014 | Todorovic | |
| 8,820,477 B1 | 9/2014 | Herrera et al. | |
| 8,955,643 B2 | 2/2015 | Liu | |
| 2007/0141376 A1 | 6/2007 | Askishev et al. | |
| 2009/0090580 A1 * | 4/2009 | Hotzeldt | B32B 3/20 |
| | | | 181/290 |
| 2011/0100747 A1 | 5/2011 | Hoetzeldt et al. | |
| 2013/0266772 A1 | 10/2013 | Fujii | |
| 2014/0145141 A1 | 5/2014 | Liu | |
| 2014/0349082 A1 | 11/2014 | Tien | |
| 2015/0284945 A1 | 10/2015 | Tien | |
| 2015/0292413 A1 | 10/2015 | Soria et al. | |
| 2015/0367953 A1 * | 12/2015 | Yu et al. | B64D 33/06 |
| | | | 181/222 |

FOREIGN PATENT DOCUMENTS

| | | |
|---|---|---|
| GB | 1406844 | 9/1975 |
| RU | 2413654 | 6/2010 |

* cited by examiner

ACOUSTIC PANEL WITH ANGLED CORRUGATED CORE STRUCTURES

BACKGROUND OF THE INVENTION

1. Technical Field

This disclosure relates generally to noise attenuation and, more particularly, to an acoustic panel for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide such a panel with the same or more structural integrity than previous acoustic panels.

SUMMARY OF THE DISCLOSURE

According to an aspect of the present disclosure, a panel is provided for attenuating noise. This panel includes a first skin, a second skin and a core, which forms a plurality of cavities vertically between the first skin and the second skin. The core includes a first wall, a second wall, a first baffle, a second baffle and a first septum. The cavities include a first cavity formed laterally between the first wall and the second wall and longitudinally between the first baffle and the second baffle. The first septum is longitudinally between the first baffle and the second baffle and divides the first cavity into fluidly coupled sub-cavities. The first septum is angularly offset from the first wall by an acute angle. One or more perforations in the first skin are fluidly coupled with the first cavity.

According to another aspect of the present disclosure, another panel is provided for attenuating noise. This panel includes a first skin, a second skin and a core, which forms a plurality of cavities vertically between the first skin and the second skin. The core includes a first wall, a second wall, a plurality of baffles and a plurality of septums interdisposed with the baffles to provide a corrugated structure. The cavities include a first cavity formed laterally between the first wall and the second wall and longitudinally between a first of the baffles and a second of the baffles. A first of the septums is longitudinally between the first of the baffles and the second of the baffles and divides the first cavity into fluidly coupled sub-cavities. The first of the septums is angularly offset from the first wall by an acute angle. One or more perforations in the first skin are fluidly coupled with the first cavity.

The first of the baffles and the second of the baffles may be angularly offset from the first wall by an acute angle. The first of the baffles and the second of the baffles may also or alternatively be angularly offset from the first skin by an acute angle.

The first of the septums may be connected to the first of the baffles and the second of the baffles. The first of the baffles, the second of the baffles and the first of the septums may also or alternatively each extend between and be connected to the first wall and the second wall.

The core may include a third wall, a plurality of second baffles and a plurality of second septums interdisposed with the second baffles to provide a second corrugated structure. The cavities may include a second cavity formed laterally between the first wall and the third wall and longitudinally between a first of the second baffles and a second of the second baffles. A first of the second septums may be longitudinally between the first of the second baffles and the second of the second baffles and divide the second cavity into fluidly coupled sub-cavities. The first of the second septums may be angularly offset from the first wall by an acute angle. One or more perforations in the first skin may be fluidly coupled with the second cavity.

An intersection between the first of the septums and the first of the baffles at the first wall and the first skin may be longitudinally aligned with an intersection between the first of the second septums and the first of the second baffles at the first wall and the first skin.

The first baffle and the second baffle may be angularly offset from the first wall by an acute angle.

The first septum may be connected to the first baffle and the second baffle.

The first baffle, the second baffle and the first septum may each extend between and be connected to the first wall and the second wall.

The first septum may be angularly offset from the first skin by an acute angle.

The first septum may be perpendicular to the first skin.

The first baffle may be angularly offset from the first skin by an acute angle.

The core may include a third wall, a third baffle, a forth baffle and a second septum. The cavities may include a second cavity formed laterally between the first wall and the third wall and longitudinally between the third baffle and the fourth baffle. The second septum may be longitudinally between the third baffle and the fourth baffle and divide the second cavity into fluidly coupled sub-cavities. The second septum may be angularly offset from the first wall by an acute angle. One or more perforations in the first skin may be fluidly coupled with the second cavity.

The acute angle between the second septum and the first wall may be equal to the acute angle between the first septum and the first wall. Alternatively, the acute angles may be different from one another.

An intersection between the first septum and the first baffle at the first wall may be longitudinally aligned with an intersection between the second septum and the third baffle at the first wall.

An intersection between the first septum and the first baffle at the first wall may be longitudinally offset from an intersection between the second septum and the third baffle at the first wall. Here, the intersection between the second septum and the third baffle at the first wall may be a closest adjacent intersection to the intersection between the first septum and the first baffle at the first wall.

An intersection between the first septum and the first baffle at the first wall may be approximately longitudinally centered between: an intersection between the second septum and the third baffle at the first wall; and an intersection between the second septum and the fourth baffle at the first wall.

The core may include a third baffle and a second septum. The cavities may include a second cavity formed laterally between the first wall and the second wall and longitudinally between the first baffle and the third baffle. The second septum may be longitudinally between the first baffle and the third baffle and divide the second cavity into fluidly coupled sub-cavities. The second septum may be angularly offset from the first wall by an acute angle. One or more perforations in the first skin may be fluidly coupled with the second cavity.

The acute angle between the second septum and the first wall may be equal to the acute angle between the first septum and the first wall. Alternatively, the acute angles may be different from one another.

The panel may be configured as a component of an aircraft propulsion system.

The foregoing features and the operation of the invention will become more apparent in light of the following description and the accompanying drawings.

DETAILED DESCRIPTION OF THE INVENTION

Figure 1:
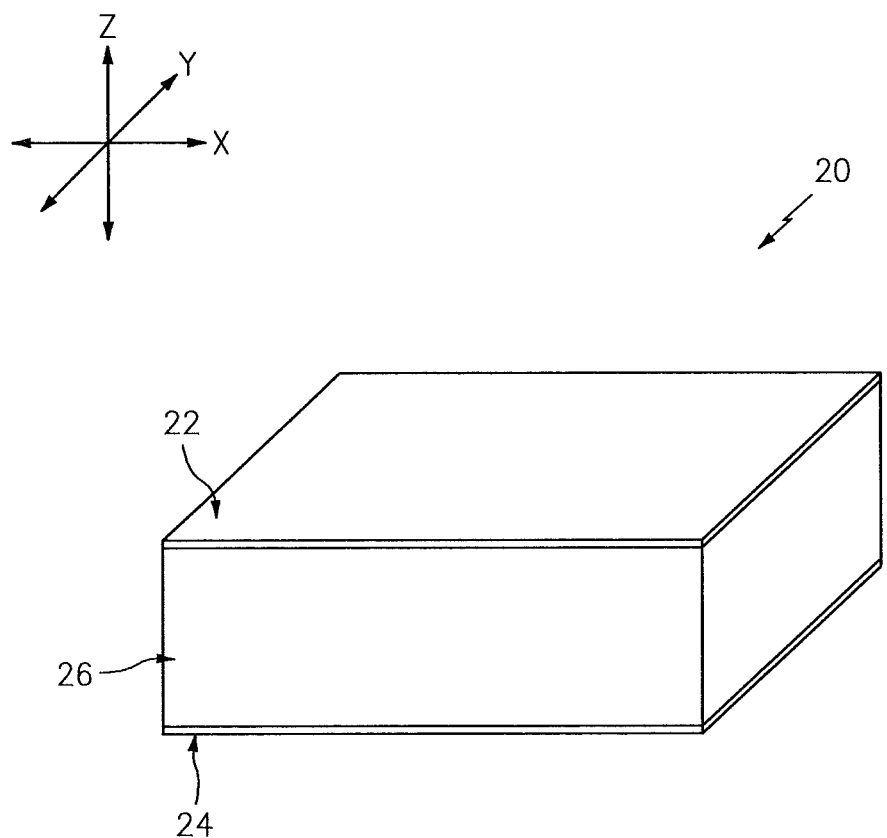
FIG. 1 is a partial, perspective block diagram illustration of a structural, acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system.

The acoustic panel 20, for example, may be configured as or with an inner or outer barrel, a translating sleeve of a thrust reverser, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends longitudinally along an x-axis. The acoustic panel 20 extends laterally along a y-axis. The acoustic panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical or conical with or without radial undulations.

The acoustic panel 20 includes a perforated first (e.g., face) skin 22, a solid, non-perforated second (e.g., back) skin 24 and a cellular core 26. Briefly, the cellular core 26 is disposed and extends vertically between the first skin 22 and the second skin 24. The cellular core 26 is also connected to the first skin 22 and the second skin 24. The cellular core 26, for example, may be welded, brazed, fused, adhered or otherwise bonded to the first skin 22 and/or the second skin 24. The cellular core 26 may also or alternatively be mechanically fastened to the first skin 22 and/or the second skin 24. Alternatively, the cellular core 26 may be formed integral with the first skin 22 and/or the second skin 24 as a monolithic body using, for example, additive manufacturing. However, the present disclosure is not limited to any particular manufacturing methods.

Figure 2:
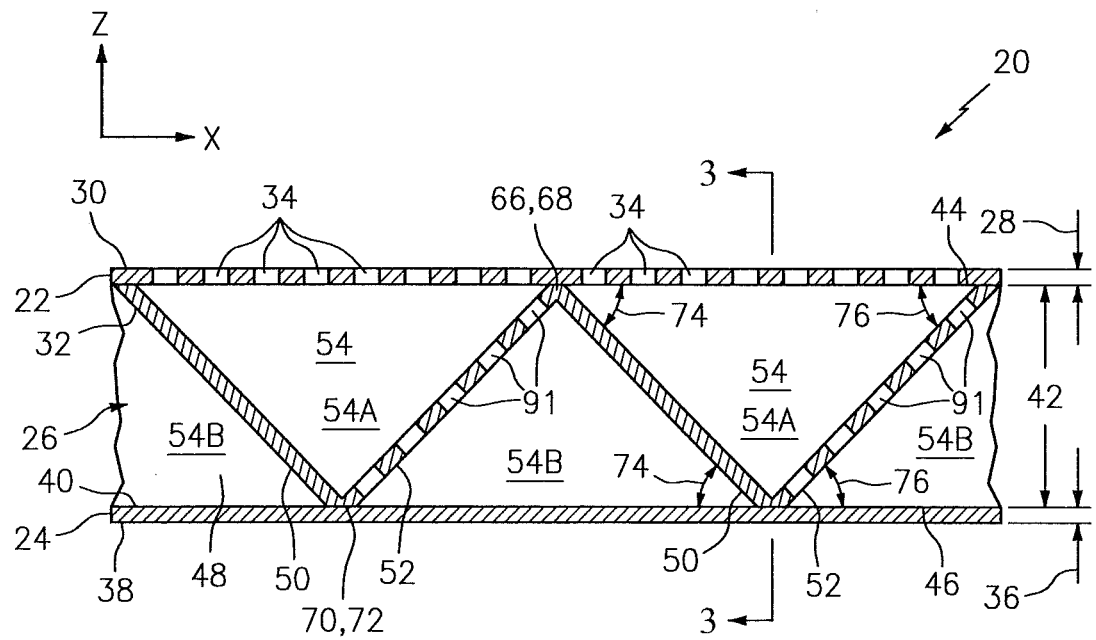
FIG. 2 is a sectional illustration of a portion of the acoustic panel taken in an x-z plane.

The first skin 22 may be configured as a relatively thin sheet or layer of material that extends laterally and longitudinally along the x-y plane. This first skin material may include, but is not limited to, a metal, a polymer, a fiber reinforced composite (e.g., fiberglass composite, carbon fiber composite, aramid fiber composite, etc.), or a combination thereof. Referring now to FIG. 2, the first skin 22 has a vertical thickness 28, which extends vertically between opposing side surfaces 30 and 32. The first skin 22 includes a plurality of perforations 34; e.g., apertures such as through-holes. Each of these perforations 34 extends generally vertically through the first skin 22 between its side surfaces 30 and 32.

The second skin 24 may be configured as a relatively thin sheet or layer of (e.g., continuous and uninterrupted) material that extends laterally and longitudinally along the x-y plane (see FIG. 1). This second skin material may include, but is not limited to, a metal, a polymer, a fiber reinforced composite (e.g., fiberglass composite, carbon fiber composite, aramid fiber composite, etc.), or a combination thereof. The second skin material may be the same as or different than the first skin material. The second skin 24 has a vertical thickness 36, which extends vertically between opposing side surfaces 38 and 40. This vertical thickness 36 may be substantially equal to or different (e.g., greater or less) than the vertical thickness 28 of the first skin 22.

Figure 4:
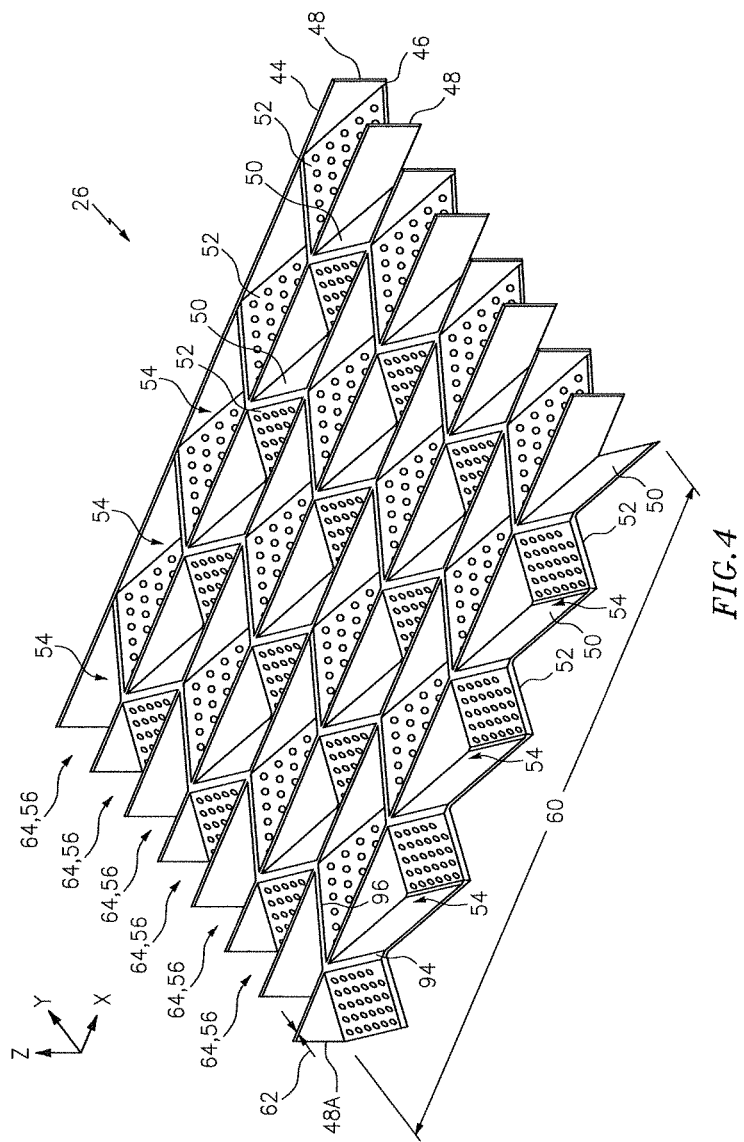
FIGS. 4 and 5 are perspective illustrations of a portion of a cellular core for the acoustic panel at different spatial orientations.
Figure 5:
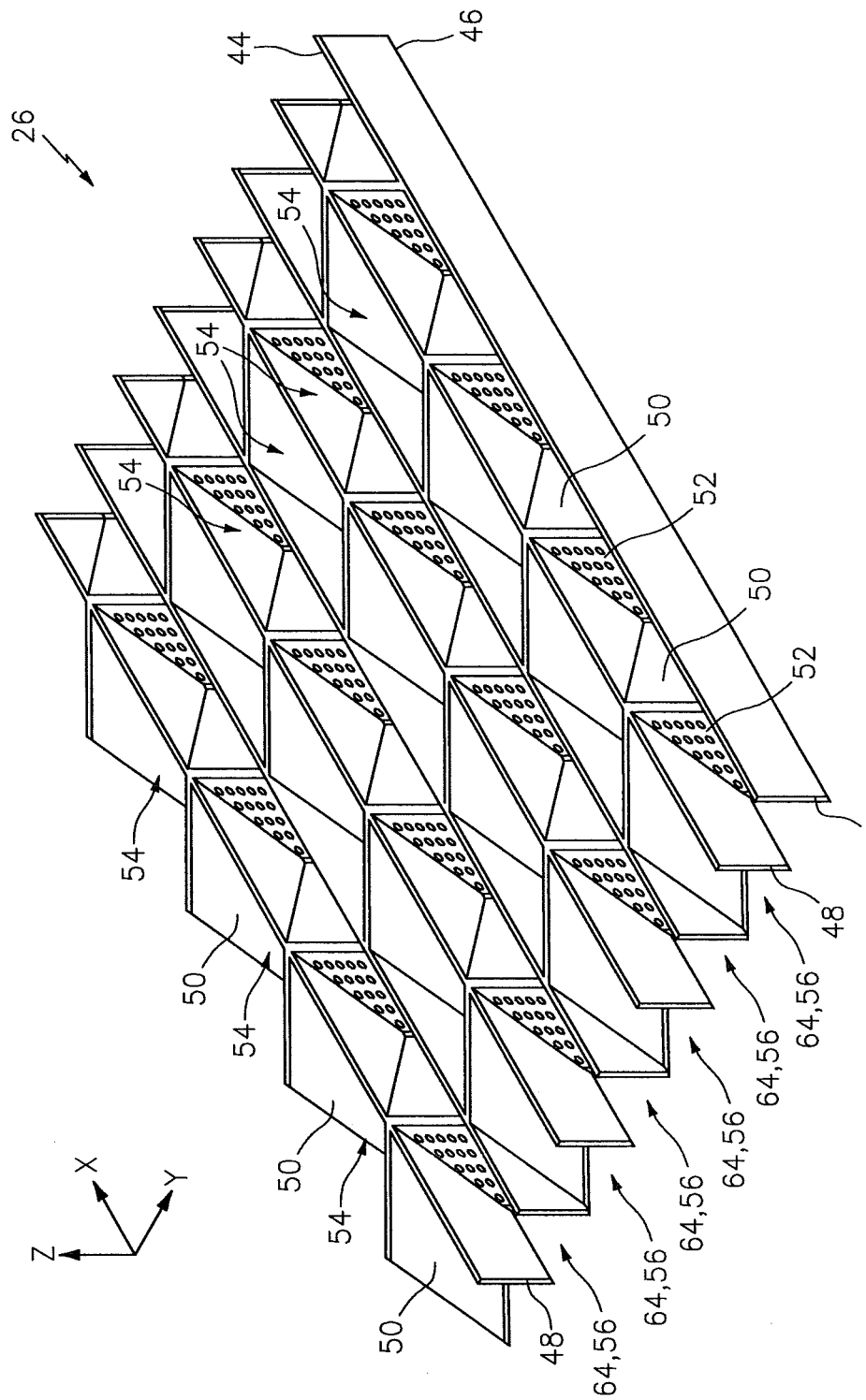
Figure 6:
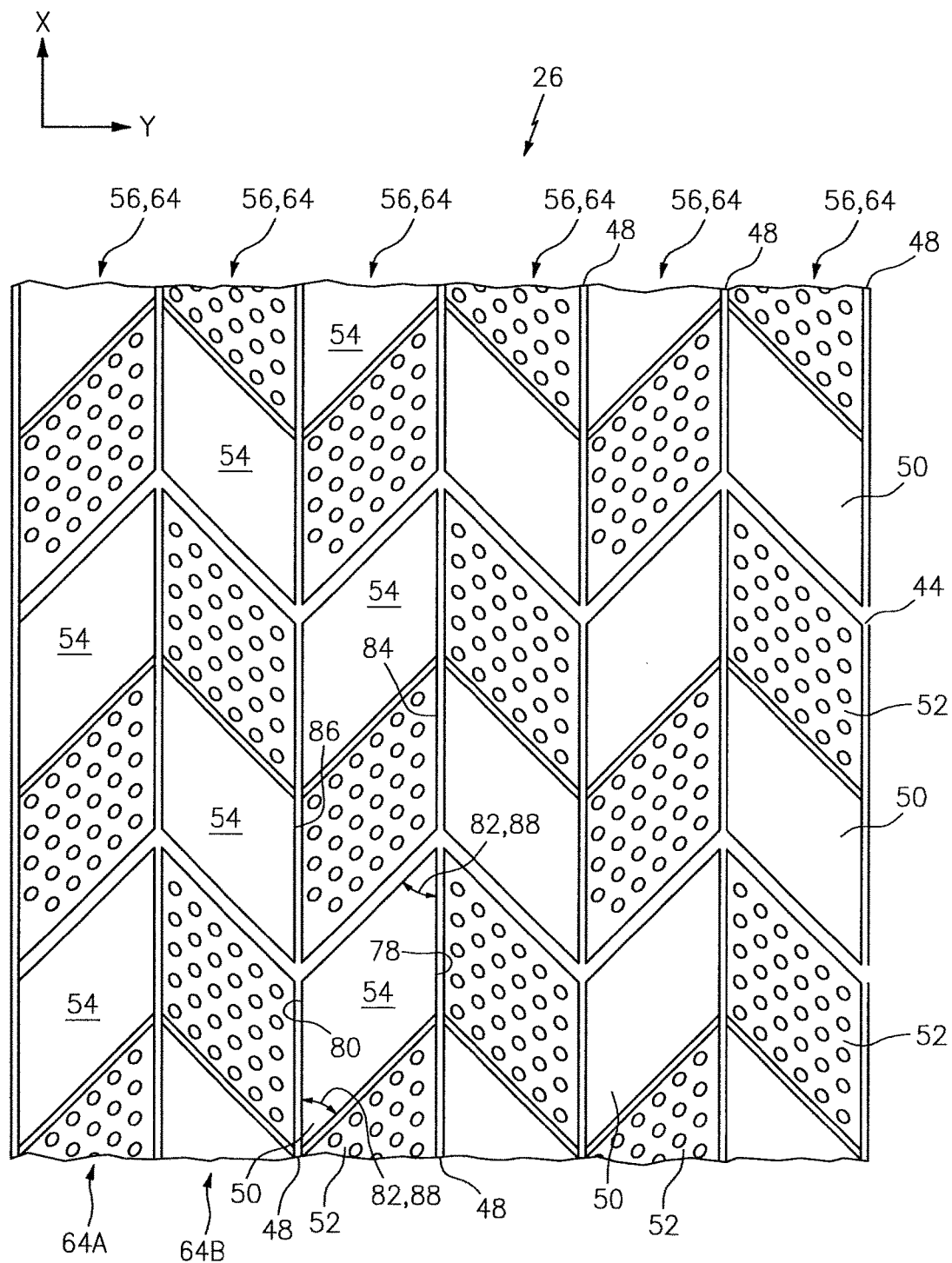
FIG. 6 is a top view illustration of a portion of the cellular core.

Referring to FIGS. 4 to 6, the cellular core 26 extends laterally and longitudinally along the x-y plane. Referring again to FIG. 2, the cellular core 26 has a vertical thickness 42, which extends vertically between opposing core sides 44 and 46 respectively abutted against the first skin 22 and the second skin 24. The vertical thickness 42 may be substantially greater than the vertical thickness 28, 36 of first skin 22 and/or the second skin 24. The vertical thickness 42, for example, may be at least ten to forty times (10-40×), or more, greater than the vertical thickness 28, 36; however, the acoustic panel 20 of the present disclosure is not limited to such an exemplary embodiment.

Figure 3:
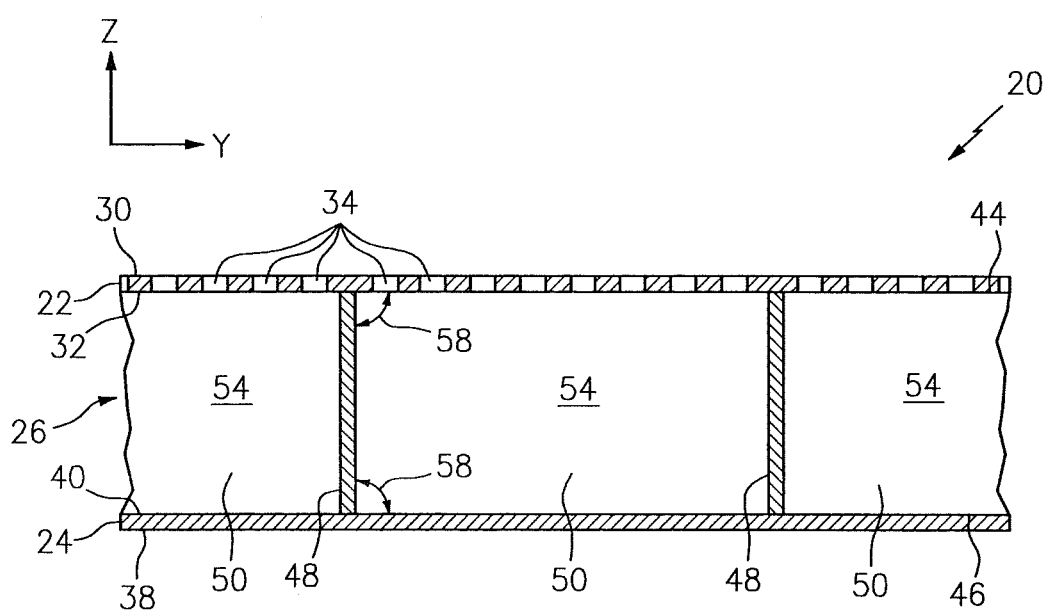
FIG. 3 is another sectional illustration of the acoustic panel portion of FIG. 2 taken in a y-z plane.

Referring to FIGS. 2, 3 and 6, the cellular core 26 includes a plurality of walls 48, a plurality of baffles 50 and a plurality of septums 52. These components 48, 50 and 52 are arranged together to configure the cellular core 26 as an open cavity (e.g., open cell) structure; see also FIGS. 4 and 5. This open cavity structure forms a plurality of cavities 54 vertically between the first skin 22 and the second skin 24. These cavities 54 may be arranged in a plurality of linear arrays 56 (best seen in FIG. 6), where each array 56 extends longitudinally along the x-axis. Each of the cavities 54 may be fluidly coupled with one or more respective perforations 34 in the first skin 22 (see FIGS. 2 and 3).

The walls 48 may be arranged generally parallel with one another. The walls 48 are laterally spaced from one another so as to respectively form the cavities 54 laterally between the walls 48. Each of the walls 48 thereby respectively forms lateral peripheral sides of the cavities 54 in at least one of the arrays 56. Furthermore, each intermediate wall 48 forms the lateral peripheral sides of the cavities 54 in a respective adjacent pair of the arrays 56; i.e., arrays 56 on either side of the respective wall 48. Each intermediate wall 48 is also disposed laterally between the respective adjacent pair of the arrays 56 and thereby fluidly separates the cavities 54 in those arrays 56 from one another. Herein, the term "intermediate wall" describes a wall 48 that is between two other walls 48.

Referring to FIGS. 2 and 3, each of the walls 48 extends vertically between the first skin 22 and the second skin 24. Each of the walls 48 may also be connected (e.g., bonded and/or otherwise) to the first skin 22 and/or the second skin 24. Each of the walls 48 is orientated substantially perpendicular to the first skin 22 and the second skin 24; e.g., at a ninety degree angle 58 to the skins 22 and 24 as best seen in FIG. 3. However, in other embodiments, one or more of the walls 48 may be offset from the first skin 22 and/or the second skin 24 by a non-ninety degree angle; e.g., an acute included angle or an obtuse angle.

Referring to FIG. 4, each of the walls 48 has a length 60 that extends longitudinally along the x-axis. Each of the walls 48 has a thickness 62 that extends laterally along the y-axis, where the length 60 is substantially larger than the thickness 62. The present disclosure, however, is not limited to the foregoing size relationship between the length 60 and thickness 62 of the walls 48.

The baffles 50 and the septums 52 are grouped together into a plurality of linear, longitudinally extending arrays 64. Each of these arrays 64 includes a subset (e.g., linear sub-array) of the baffles 50 and a subset (e.g., linear sub-array) of the septums 52. The baffles 50 in each array 64 are interdisposed with the septums 52 in that array 64. More particularly, each of the baffles 50 is disposed and may extend longitudinally between a respective adjacent pair of the septums 52. Similarly, each of the septums 52 is disposed and may extend longitudinally between a respective adjacent pair of the baffles 50.

Referring to FIG. 2, a top end 66 of each of the baffles 50 is engaged with and/or connected to the first skin 22. This top end 66 of FIG. 2 is also longitudinally engaged with and/or connected to a top end 68 of an adjacent one of the septums 52, unless that baffle 50 is an end baffle. An opposing bottom end 70 of each of the baffles 50 is connected to the second skin 24. This bottom end 70 of FIG. 2 is also longitudinally engaged with and/or connected to a bottom end 72 of an adjacent one of the septums 52, unless that baffle 50 is an end baffle. Thus, each of the baffles 50 of FIG. 2 extends vertically between the first skin 22 and the second skin 24 and is angularly offset from the first skin 22 and the second skin 24 by an angle 74 (e.g., an acute angle) such as, but not limited to, about forty-five degrees (45°). Note, the terms "top" and "bottom" are used above to describe ends of the baffles 50 as situated in the drawings and are not intended to limit the baffles 50 or the acoustic panel 20 to such an exemplary gravitational orientation.

The top end 68 of each of the septums 52 is vertically engaged with and/or connected to the first skin 22. The opposing bottom end 72 of each of the septums 52 is vertically engaged with and/or connected to the second skin 24. Thus, each of the septums 52 of FIG. 2 extends vertically between the first skin 22 and the second skin 24 and is angularly offset from the first skin 22 and the second skin 24 by an angle 76. This angle 76 may be an acute angle such as, but not limited to, about forty-five degrees (45°). The angle 76 may be substantially equal to the angle 74 as shown in FIG. 2. However, in other embodiments, the angle 76 may be greater than (see FIG. 7, where the angle 76 is about ninety degrees (90°)) or less than the angle 74. Note, the terms "top" and "bottom" are used above to describe ends of the septums 52 as situated in the drawings and are not intended to limit the septums 52 or the acoustic panel 20 to such an exemplary gravitational orientation.

Figure 13:
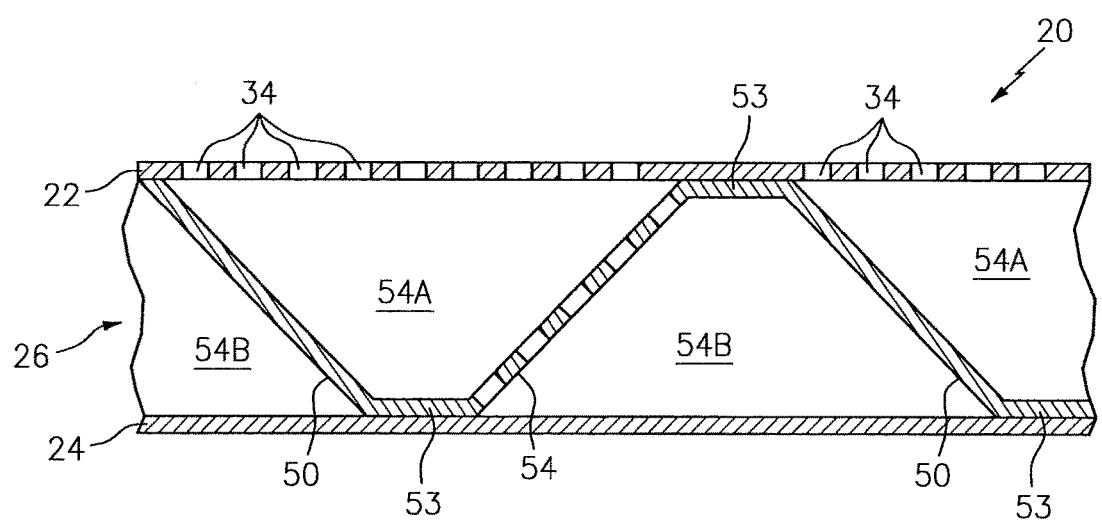
FIG. 13 is a sectional illustration of a portion of another acoustic panel taken in an x-z plane.

With the afore-described arrangement of baffles 50 and septums 52, each array 64 (see also FIGS. 4 and 5) of baffles 50 and septums 52 is configured as a corrugated structure. This corrugated structure includes a plurality of corrugations. Each of these corrugations includes one of the baffles 50 and one of the septums 52. Of course, in other embodiments, one or more of the corrugations may also each include an additional element (e.g., a bridge 53; see FIG. 13) and/or have a longitudinal gap between the respective baffle 50 and septum 52.

Referring now to FIG. 6, a right side 78 of each of the baffles 50 is laterally engaged with and/or connected to an adjacent one of the walls 48 (herein referred to as "a right side wall" for ease of description). An opposing left side 80 of each of the baffles 50 is laterally engaged with and/or connected to an adjacent one of the walls 48 (herein referred to as "a left side wall" for ease of description). Thus, each of the baffles 50 of FIG. 6 extends laterally between the respective right side and left side walls 48 and is angularly offset from the right side wall and the left side wall by an angle 82. This angle 82 is an acute angle such as, but not limited to, about thirty degrees (30°). Note, the terms "right" and "left" are used above to describe sides of the baffles 50 as situated in the drawings and are not intended to limit the baffles 50 or the acoustic panel 20 to such an exemplary orientation.

A right side 84 of each of the septums 52 is laterally engaged with and/or connected to an adjacent one of the walls 48 (herein referred to as "a right side wall" for ease of description). An opposing left side 86 of each of the septums 52 is laterally engaged with and/or connected to an adjacent one of the walls 48 (herein referred to as "a left side wall" for ease of description). Thus, each of the septums 52 of FIG. 6 extends laterally between the respective right side and left side walls 48 and is angularly offset from the right side wall and the left side wall by an angle 88. This angle 88 is an acute (or obtuse) angle such as, but not limited to, about thirty degrees (30°). The angle 88 may be substantially equal to the angle 82 as shown in FIG. 6. However, in other embodiments, the angle 88 may be greater than or less than the angle 82 where, for example, there is a longitudinal bridge (see FIG. 13) and/or gap between a respective pair of a baffle 50 and a septum 52. Note, the terms "right" and "left" are used above to describe sides of the baffles 50 as situated in the drawings and are not intended to limit the baffles 50 or the acoustic panel 20 to such an exemplary orientation.

Figure 8:
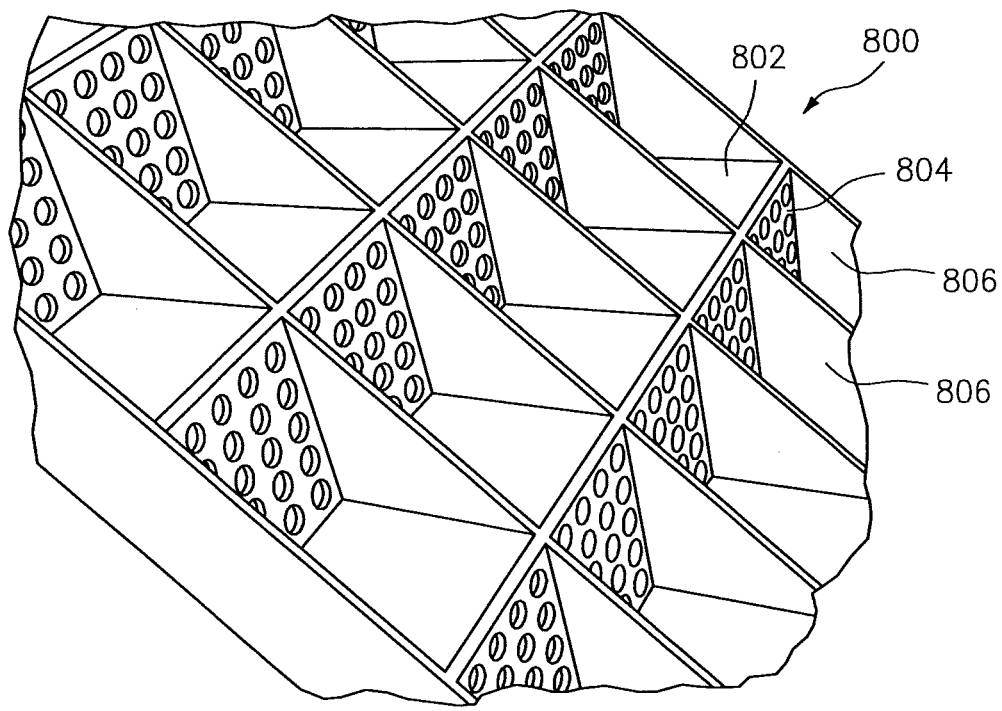
FIG. 8 is a perspective illustration of a portion of another cellular core for another acoustic panel.

With the afore-described configuration, the angled baffles 50 and the angled septums 52 increase surface areas of the cellular core 26 that are next to and vertically engage the first skin 22 and the second skin 24. By increasing the surface area (compared to a core 800 with baffles 802 and septums 804 perpendicular to walls 806 as shown in FIG. 8), more area is available for connecting (e.g., bonding and/or otherwise) the cellular core 26 to the first skin 22 and the second skin 24. In this manner, the acoustic panel 20 can withstand higher shear forces than an acoustic panel configured with the core 800 as shown FIG. 8. The angled baffles 50 and the angled septums 52 provide the cellular core 26 of FIGS. 4 and 5 with an increased stiffness compared to the core 800 shown in FIG. 8. The angled baffles 50 and the angled septums 52 also enable a more uniform distribution of loads between the cellular core 26 and the first skin 22 and the second skin 24 compared to the core 800 shown in FIG. 8.

Referring to FIG. 2, each of the cavities 54 extends longitudinally between and is formed by an adjacent pair of the baffles 50. Each of the septums 52 is disposed within and divides a respective one of the cavities 54 into fluidly coupled sub-cavities 54A and 54B. More particularly, one or more perforations 91 in the septum 52 fluidly couple the sub-cavities 54A and 54B together.

Figure 9:
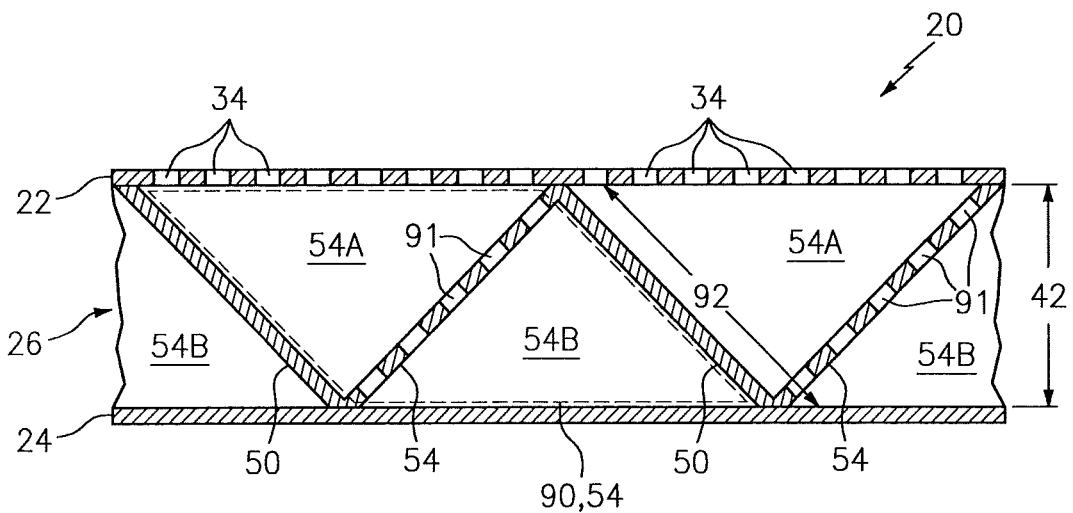
FIG. 9 is another sectional illustration of the acoustic panel portion of FIG. 2.

Referring to FIG. 9, with the foregoing cellular core 26 configuration, each of the cavities 54 forms a resonance chamber 90 (shown by the dashed line). A length 92 of the resonance chamber 90 extends diagonally between the first skin 22 and the second skin 24 and through a respective one of the septums 52. The length 92 of the resonance chamber 90 therefore is longer than the vertical thickness 42 of the cellular core 26. This enables noise attenuation of relatively low frequency noise without increasing the vertical thickness 42 of the core 26 and, thus, the vertical thickness of the acoustic panel 20. For example, each resonance chamber 90 may receive noise waves through the perforations 34 in the first skin 22. The resonance chamber 90 may reverse the phase of one or more frequencies of those sound waves using known acoustic reflection principles and subsequently direct the reverse phase sound waves out of the acoustic panel 20 through the perforations 34 to destructively interfere with other incoming noise waves.

The cellular core 26 may be constructed from any suitable material(s). The cellular core 26, for example, may be constructed from a metal, a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. One or more of components of the cellular core 26 may be constructed from the same or a like material. Alternatively, one or more of the components of the cellular core 26 may be constructed from a different material than one or more of the other components of the cellular core 26. Furthermore, the cellular core 26 may be constructed from the same material(s) as the first skin 22 and/or the second skin 24, or a different material or materials.

Figure 10:
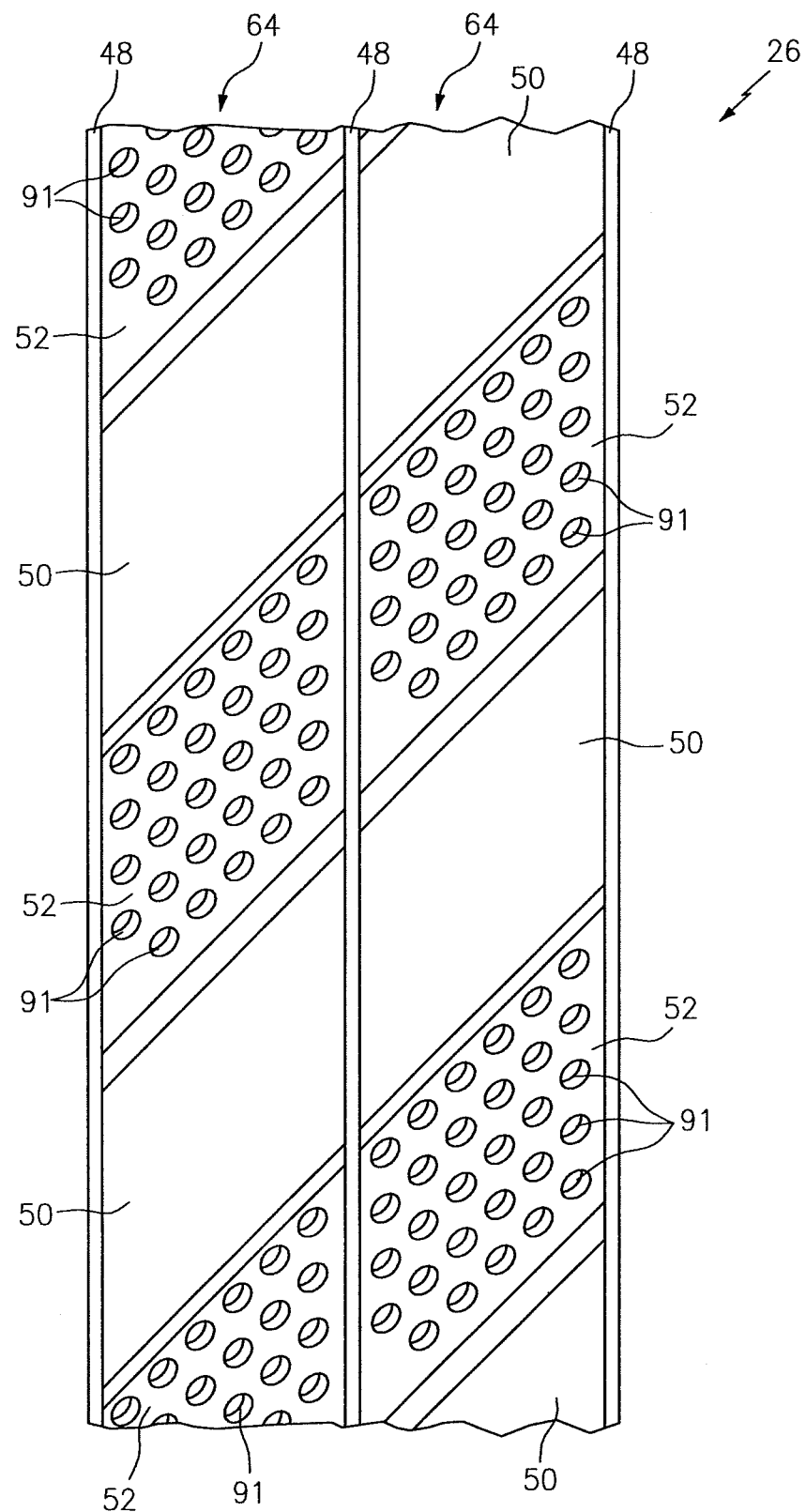
FIG. 10 is a top view illustration of a portion of another cellular core for the acoustic panel of FIG. 1.

Referring to FIG. 6, in some embodiments, adjacent corrugated structures may have generally opposite configurations. For example, each of the baffles 50 and the septums 52 in a first of the arrays 64 (labeled as "64A") may extend longitudinally in a first longitudinal direction (e.g., upwards on the page) as it extends laterally between the walls 48 in a first lateral direction (e.g., from left to right across the page). In contrast, each of the baffles 50 and the septums 52 in an adjacent second of the arrays 64 (labeled as "64B") may extend longitudinally in a second longitudinal direction (e.g., downwards on the page) as it extends laterally between the walls 48 in the first lateral direction. Alternatively, as shown in FIG. 10, at least some adjacent corrugated structures may have generally the same configurations.

Figure 11:
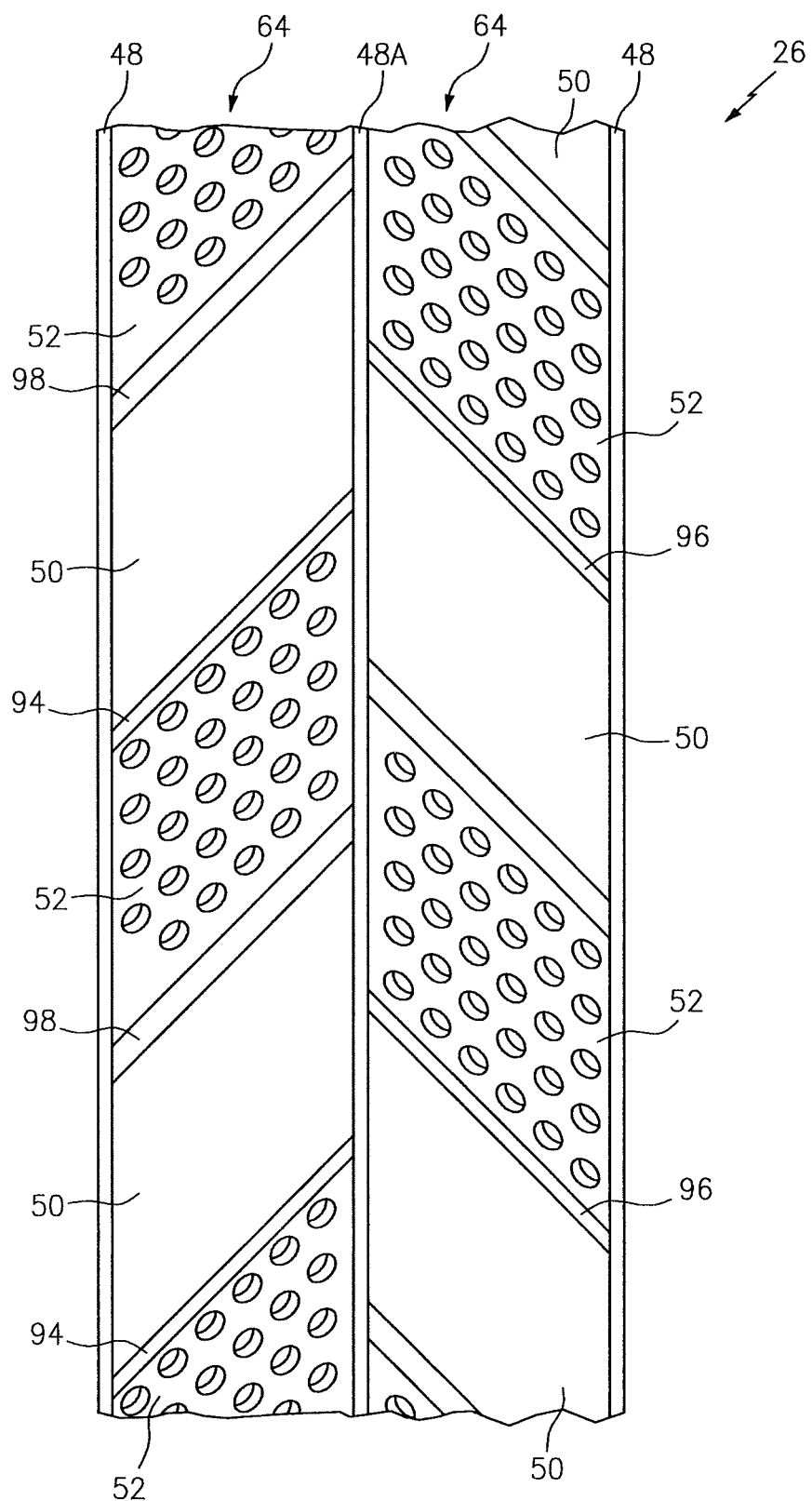
FIG. 11 is a top view illustration of a portion of another cellular core for the acoustic panel of FIG. 1.
Figure 12:
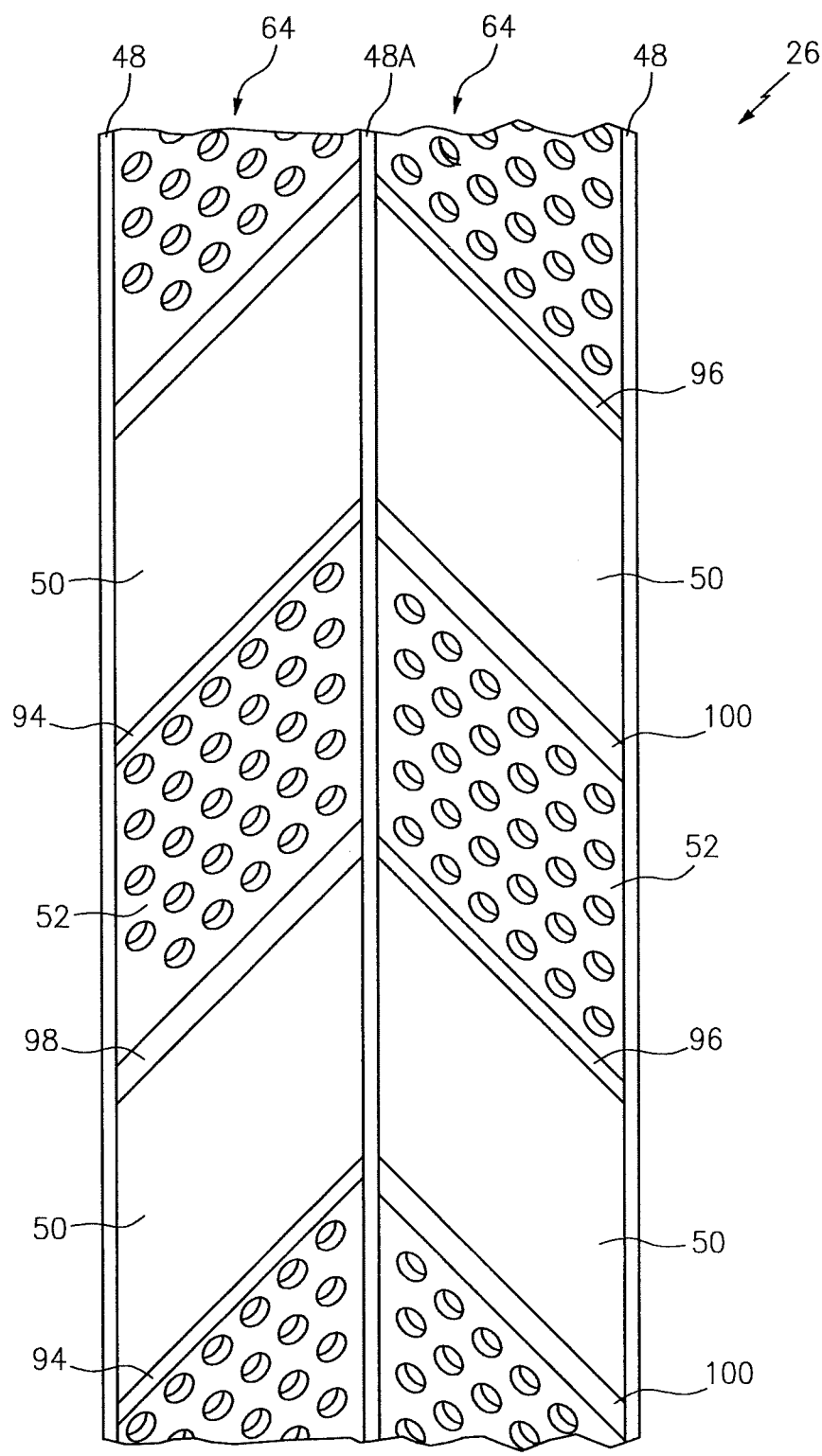
FIG. 12 is a top view illustration of a portion of another cellular core for the acoustic panel of FIG. 1.

Referring to FIG. 4, in some embodiments, the baffles 50 and the septums 52 in adjacent corrugated structures may be substantially longitudinally aligned with one another. For example, an intersection 94, at a first wall (labeled as "48A") and at the first skin 22 (not shown in FIG. 4), between one of the baffles 50 and an adjacent one of the septums 52 in a first of the arrays 64 may be substantially longitudinally aligned with an intersection 96, at the first wall 48A and at the first skin 22, between one of the baffles 50 and an adjacent one of the septums 52 in a second of the arrays 64. In this manner, the baffles 50 and the septums 52 are configured in a chevron pattern. Alternatively, as shown in FIG. 11, the intersection 94 may be misaligned with (longitudinally offset from) the corresponding closest intersection 96. The intersection 94, for example, may be longitudinally intermediate (e.g., centered) between the intersections 94 and 98. Still alternatively, as shown in FIG. 12, the intersection 94, at the first wall 48A and at the first skin 22 (not shown in FIG. 12), between one of the baffles 50 and an adjacent one of the septums 52 in a first of the arrays may be substantially longitudinally aligned with an intersection 100, at the first wall 48A and at the second skin 24 (not shown in FIG. 12), between one of the baffles 50 and an adjacent one of the septums 52 in a second of the arrays 64.

Figure 7:
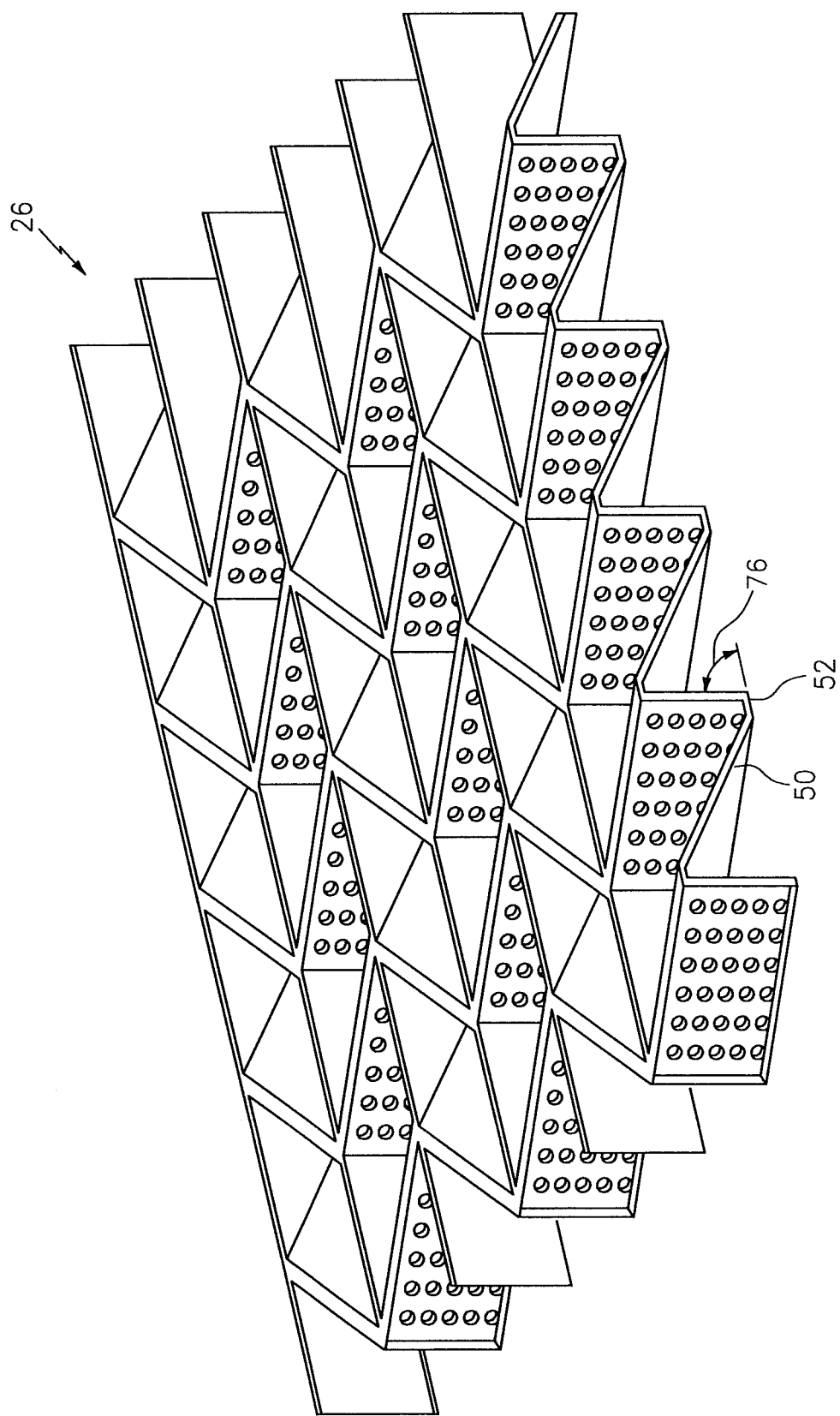
FIG. 7 is a perspective illustration of a portion of another cellular core for the acoustic panel.

Referring to FIG. 6, in some embodiments, the septums 52 in a first of the arrays 64 may be longitudinally aligned with the baffles 50 in an adjacent second of the arrays 64. Since the perforations 91 may affect the stiffness and structural integrity of the septums 54, misaligning the septums 54 in adjacent arrays 64 may generally allow for more uniform load distribution through the core 26. Alternatively, as shown in FIGS. 7, 10 and 12, the septums 52 in the first of the arrays 64 may be longitudinally aligned with the septums 52 in the adjacent second of the arrays 64.

In some embodiments, the thickness of at least one of the walls 48 may be the same as or different than the thickness of at least one of the septums 52 and/or at least one of the baffles 50. At least one of the walls 48 may be made from the same material as or a different material than at least one of the septums 52 and/or at least one of the baffles 50. The thickness of septum 52 may also or alternatively be the same as or different than the thickness of the baffle 50.

In some embodiments, all of the components in the cellular core 26 may be structural. In other embodiments, select components in the cellular core 26 may be structural where other components may be non-structural. For example, the walls 48 can be structural whereas the N-ribbons (e.g., the septums 54 and baffles 50) can be non-structural, or vice-versa.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A panel for attenuating noise, comprising:
   a first skin;
   a second skin; and
   a core forming a plurality of cavities vertically between the first skin and the second skin, the core including a first wall, a second wall, a first baffle, a second baffle and a first septum;
   the cavities including a first cavity formed laterally between the first wall and the second wall and longitudinally between the first baffle and the second baffle; and
   the first septum longitudinally between the first baffle and the second baffle and dividing the first cavity into fluidly coupled sub-cavities;
   wherein the first septum is angularly offset from the first wall by an acute angle;
   wherein one or more perforations in the first skin are fluidly coupled with the first cavity; and
   wherein the first baffle, the second baffle and the first septum each extends between and is connected to the first wall and the second wall.

2. The panel of claim 1, wherein the first septum is connected to the first baffle and the second baffle.

3. The panel of claim 1, wherein the first septum is angularly offset from the first skin by an acute angle.

4. The panel of claim 1, wherein
   the core further includes a third wall, a third baffle, a fourth baffle and a second septum;
   the cavities further include a second cavity formed laterally between the first wall and the third wall and longitudinally between the third baffle and the fourth baffle;
   the second septum is longitudinally between the third baffle and the fourth baffle and divides the second cavity into fluidly coupled sub-cavities;
   the second septum is angularly offset from the first wall by an acute angle; and
   one or more perforations in the first skin are fluidly coupled with the second cavity.

5. The panel of claim 4, wherein the acute angle between the second septum and the first wall is equal to the acute angle between the first septum and the first wall.

6. The panel of claim 4, wherein an intersection between the first septum and the first baffle at the first wall is longitudinally aligned with an intersection between the second septum and the third baffle at the first wall.

7. The panel of claim 4, wherein an intersection between the first septum and the first baffle at the first wall is longitudinally offset from an intersection between the second septum and the third baffle at the first wall.

8. The panel of claim 4, wherein an intersection between the first septum and the first baffle at the first wall is approximately longitudinally centered between an intersection between the second septum and the third baffle at the first wall; and
   an intersection between the second septum and the fourth baffle at the first wall.

9. The panel of claim 1, wherein
   the core further includes a third baffle and a second septum;
   the cavities further include a second cavity formed laterally between the first wall and the second wall and longitudinally between the first baffle and the third baffle;
   the second septum is longitudinally between the first baffle and the third baffle and divides the second cavity into fluidly coupled sub-cavities;
   the second septum is angularly offset from the first wall by an acute angle; and
   one or more perforations in the first skin are fluidly coupled with the second cavity.

10. The panel of claim 9, wherein the acute angle between the second septum and the first wall is equal to the acute angle between the first septum and the first wall.

11. The panel of claim 1, wherein the panel is configured as a component of an aircraft propulsion system.

12. A panel for attenuating noise, comprising:
    a first skin;
    a second skin; and
    a core forming a plurality of cavities vertically between the first skin and the second skin, the core including a first wall, a second wall, a first baffle, a second baffle and a first septum;
    the cavities including a first cavity formed laterally between the first wall and the second wall and longitudinally between the first baffle and the second baffle; and
    the first septum longitudinally between the first baffle and the second baffle and dividing the first cavity into fluidly coupled sub-cavities;
    wherein the first septum is angularly offset from the first wall by an acute angle;
    wherein one or more perforations in the first skin are fluidly coupled with the first cavity; and
    wherein the first baffle and the second baffle are angularly offset from the first wall by an acute angle.

13. A panel for attenuating noise, comprising:
    a first skin;
    a second skin; and
    a core forming a plurality of cavities vertically between the first skin and the second skin, the core including a first wall, a second wall, a first baffle, a second baffle and a first septum;
    the cavities including a first cavity formed laterally between the first wall and the second wall and longitudinally between the first baffle and the second baffle; and
    the first septum longitudinally between the first baffle and the second baffle and dividing the first cavity into fluidly coupled sub-cavities;
    wherein the first septum is angularly offset from the first wall by an acute angle;
    wherein one or more perforations in the first skin are fluidly coupled with the first cavity; and
    wherein the first septum is perpendicular to the first skin.

14. A panel for attenuating noise, comprising:
    a first skin;
    a second skin; and a core forming a plurality of cavities vertically between the first skin and the second skin, the core including a first wall, a second wall, a first baffle, a second baffle and a first septum;

the cavities including a first cavity formed laterally between the first wall and the second wall and longitudinally between the first baffle and the second baffle; and the first septum longitudinally between the first baffle and the second baffle and dividing the first cavity into fluidly coupled sub-cavities;

wherein the first septum is angularly offset from the first wall by an acute angle;

wherein one or more perforations in the first skin are fluidly coupled with the first cavity; and wherein the first baffle is angularly offset from the first skin by an acute angle.

15. A panel for attenuating noise, comprising:

a first skin;

a second skin; and a core forming a plurality of cavities vertically between the first skin and the second skin, the core including a first wall, a second wall, a plurality of baffles and a plurality of septums interdisposed with the baffles to provide a corrugated structure;

the cavities including a first cavity formed laterally between the first wall and the second wall and longitudinally between a first of the baffles and a second of the baffles; and a first of the septums longitudinally between the first of the baffles and the second of the baffles and dividing the first cavity into fluidly coupled sub-cavities;

wherein the first of the septums is angularly offset from the first wall by an acute angle; and wherein one or more perforations in the first skin are fluidly coupled with the first cavity.

16. The panel of claim 15, wherein the first of the baffles and the second of the baffles are angularly offset from the first wall by an acute angle, and the first of the baffles and the second of the baffles are angularly offset from the first skin by an acute angle.

17. The panel of claim 15, wherein the first of the septums is connected to the first of the baffles and the second of the baffles; and the first of the baffles, the second of the baffles and the first of the septums each extends between and is connected to the first wall and the second wall.

18. The panel of claim 15, wherein the core further includes a third wall, a plurality of second baffles and a plurality of second septums interdisposed with the second baffles to provide a second corrugated structure;

the cavities further include a second cavity formed laterally between the first wall and the third wall and longitudinally between a first of the second baffles and a second of the second baffles;

a first of the second septums is longitudinally between the first of the second baffles and the second of the second baffles and divides the second cavity into fluidly coupled sub-cavities;

the first of the second septums is angularly offset from the first wall by an acute angle; and one or more perforations in the first skin are fluidly coupled with the second cavity.

19. The panel of claim 18, wherein an intersection between the first of the septums and the first of the baffles, at the first wall and the first skin, is longitudinally aligned with an intersection between the first of the second septums and the first of the second baffles, at the first wall and the first skin.

* * * * *